W. SNYDER.
FENDER FOR AUTOMOBILES.
APPLICATION FILED JULY 8, 1911.
1,007,150.
Patented Oct. 31, 1911.
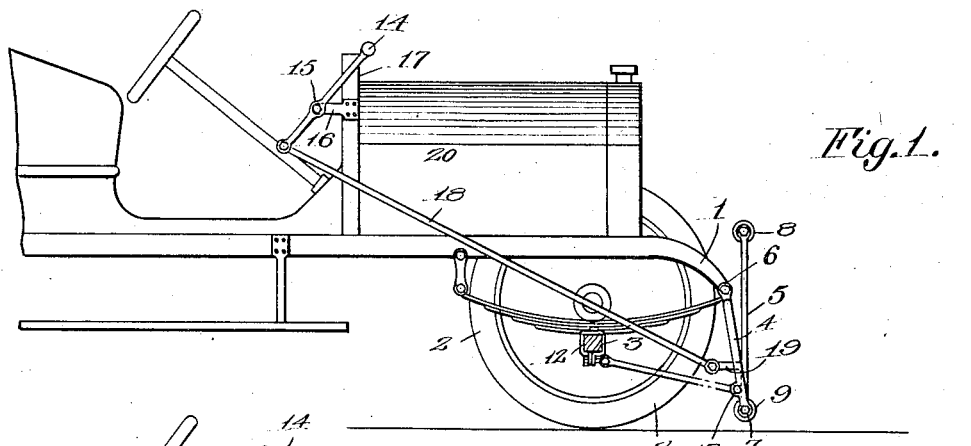
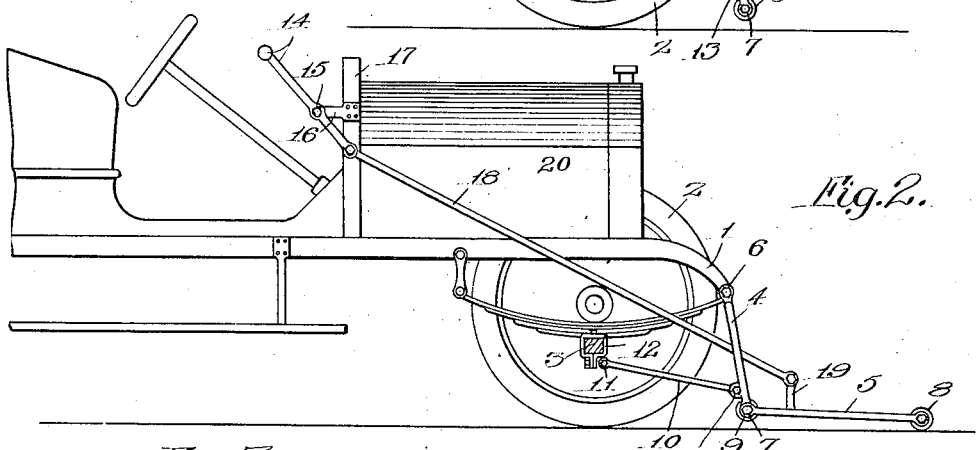
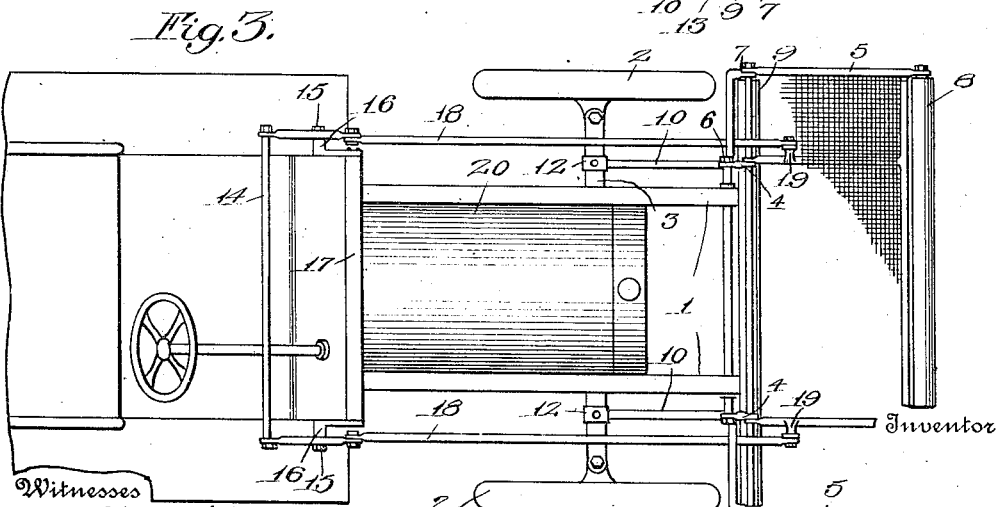
Witnesses
A. M. Whitmore
J. C. Culver
Inventor
William Snyder
By H. H. Simms
Attorney

UNITED STATES PATENT OFFICE.

WILLIAM SNYDER, OF ROCHESTER, NEW YORK.

FENDER FOR AUTOMOBILES.

1,007,150. Specification of Letters Patent. Patented Oct. 31, 1911.

Application filed July 8, 1911 Serial No. 637,482.

*To all whom it may concern:*

Be it known that I, WILLIAM SNYDER, of Rochester, in the county of Monroe and State of New York, have invented a new and useful Improvement in Fenders for Automobiles, which improvement is fully set forth in the following specification and shown in the accompanying drawings.

The present invention relates to fenders for wheeled vehicles, having been particularly designed for attachment to motor vehicles or automobiles, and the object of the invention is to provide a construction supported from the vehicle in such a position that few parts are required for sustaining the same, and, at the same time, so located that it lies in advance of the wheels of the vehicle.

Another object of the invention is to provide a fender movable from a raised to a lowered position, or vice versa, by means of a mechanism which is simple in operation and in construction.

To these and other ends the invention consists in certain parts and combinations of parts all of which will be hereinafter described, the novel features being pointed out in the appended claims.

In the drawings: Figure 1 is a side view of a portion of an automobile partly in section, showing the fender attached thereto and in raised position; Fig. 2 is a like view, showing the fender lowered; and Fig. 3 is a top view with the fender in lowered position.

According to this invention the fender is supported by the extreme forward end of the forwardly projecting springs 1 which extend in advance of the wheels 2, and are supported by the front axle 2 of the vehicle. In this instance, the fender comprises an upright portion 4 and a swinging portion 5, the upright portion being pivoted at its upper edge at 6 to swing slightly on the forward end of the forwardly projecting springs, and the lower portion 5 being pivoted at 7 to the lower edge of the upright portion, so as to swing from the position shown in Fig. 1 to that shown in Fig. 2. Preferably, the free edge of the swinging portion 5 is provided with a roller 8, and a roller 9 may be provided at the junction of the members 4 and 5 so that, if these parts should strike obstructions, they would ride freely over the same.

The fender may be braced in any suitable manner, but preferably a link or brace 10, pivoted at 11 to a clamp or collar 12 surrounding the axle 3, is pivoted at 13 to the upright portion 4 of the fender in proximity to the pivot 7. The pivots 6, 11 and 13 are provided in order that, when the body of the vehicle yields on its axle, the fender will be accommodated to such movement, this being necessary because the fender is braced from the axle.

The operating means for the fender comprises preferably a U-shaped operating member 14 having its arms pivoted between their ends at 15 to brackets 16 which are supported on the dash 17 of the vehicle. The arms of the operating members are adapted to swing on opposite sides of the dash board and are preferably connected by links 18 with arms 19 which extend laterally from the plane of the fender member 5, the links 18 lying on opposite sides of the dash and of the motor casing 20 which projects forwardly from the dash.

In the operation of the invention while the vehicle is proceeding in the ordinary way, the parts of the fender lie in the positions shown in Fig. 1. Should it be feared that the vehicle will strike a person before it can be stopped, then the operator of the machine grasps the horizontal bar of the operating member 14 and pulls the same to the rear, thus causing the portion 5 of the fender to be lowered to the position shown in Figs. 2 and 5.

A fender constructed in accordance with this invention is simple in construction and operation. It normally lies in a position where it will not interfere with the ordinary travel of the vehicle while, at the same time, it may be lowered to a position to effectively catch a person in the path of the vehicle. This fender is supported from the vehicle without the provision of complicated parts, and the operating means employs but a few parts, and is so located as to be inconspicuous.

What I claim as my invention and desire to secure by Letters Patent is:

1. The combination with a wheeled vehicle, of a fender having a swinging portion, a swinging operating member supported on the vehicle and having two arms, lying at opposite sides of the vehicle, and links connecting said arms and the swinging portion of the fender.

2. The combination with a wheeled vehicle, of a fender having a swinging portion, a U-shaped operating member pivoted on the dash of the vehicle with its arms operating on opposite sides of the dash, and links connecting the arms of the operating member and the swinging fender portion, said links lying on opposite sides of the dash.

3. The combination with a wheeled vehicle, having forwardly extending springs projecting in front of the wheels of the vehicle, of a fender comprising an upright portion suspended from the forward ends of the springs and a swinging portion at the lower end of the upright portion, a U-shaped operating member supported by the dash of the vehicle, and a pair of links lying on opposite sides of the dash and connecting the arms of the operating member with the swinging portion.

WILLIAM SNYDER.

Witnesses:
H. H. SIMMS,
A. M. WHITMORE.